(12) United States Patent
Leavy et al.

(10) Patent No.: US 10,715,504 B2
(45) Date of Patent: Jul. 14, 2020

(54) PROVISIONING EPHEMERAL KEY POOLS FOR SENDING AND RECEIVING SECURE COMMUNICATIONS

(71) Applicant: Wickr Inc., San Francisco, CA (US)

(72) Inventors: Thomas Michael Leavy, River Edge, NJ (US); Christopher Howell, Freehold, NJ (US); Joël Alwen, Vienna (AT)

(73) Assignee: Wickr Inc., Pleasanton, CA (US)

( * ) Notice: Subject to any disclaimer, the term of this patent is extended or adjusted under 35 U.S.C. 154(b) by 169 days.

(21) Appl. No.: 15/647,577

(22) Filed: Jul. 12, 2017

(65) Prior Publication Data
US 2019/0020633 A1    Jan. 17, 2019

(51) Int. Cl.
| | | |
|---|---|---|
| H04L 9/32 | (2006.01) |
| H04L 29/06 | (2006.01) |
| H04L 9/08 | (2006.01) |
| H04L 9/14 | (2006.01) |
| H04W 12/04 | (2009.01) |

(52) U.S. Cl.
CPC .......... *H04L 63/0442* (2013.01); *H04L 9/088* (2013.01); *H04L 9/0819* (2013.01); *H04L 9/0822* (2013.01); *H04L 9/0825* (2013.01); *H04L 9/0841* (2013.01); *H04L 9/0861* (2013.01); *H04L 9/0869* (2013.01); *H04L 9/0894* (2013.01); *H04L 9/14* (2013.01); *H04L 9/3247* (2013.01); *H04L 63/061* (2013.01); *H04L 63/067* (2013.01); *H04W 12/04* (2013.01); *H04W 12/0407* (2019.01); *H04L 2209/08* (2013.01)

(58) Field of Classification Search
CPC . H04L 63/0442; H04L 63/067; H04L 63/061; H04L 9/0819; H04L 9/088; H04L 9/0841; H04L 9/14; H04L 9/3247; H04L 9/0869; H04L 9/0894; H04L 9/0861; H04L 9/0825; H04L 9/0822; H04L 2209/08; H04W 12/04; H04W 12/0407
See application file for complete search history.

(56) References Cited

U.S. PATENT DOCUMENTS

| | | | |
|---|---|---|---|
| 5,799,086 A * | 8/1998 | Sudia | G06Q 20/02 705/76 |
| 8,341,401 B1 | 12/2012 | Kaufman et al. | |
| 9,083,529 B1 | 7/2015 | Statica | |
| 2002/0136410 A1 | 9/2002 | Hanna | |

(Continued)

*Primary Examiner* — Khoi V Le
(74) *Attorney, Agent, or Firm* — Banner & Witcoff, Ltd.

(57) ABSTRACT

A method, system, and non-transitory computer readable medium are described for providing a sender a plurality of ephemeral keys such that a sender and receiver can exchange encrypted communications. Accordingly, a sender may retrieve information, such as a public key and a key identifier, for the first receiver from a local storage. The retrieved information may be used to generate a key-encrypting key that is used to generate a random communication encryption key. The random communication encryption key is used to encrypt a communication, while the key-encrypting key encrypts the random communication key. The encrypted communication and the encrypted random communication key are transmitted to the first receiver.

20 Claims, 11 Drawing Sheets

(56) References Cited

U.S. PATENT DOCUMENTS

| | | |
|---|---|---|
| 2002/0191797 A1* | 12/2002 | Perlman .................. H04L 9/083 380/281 |
| 2005/0235148 A1 | 10/2005 | Scheidt et al. |
| 2007/0256141 A1 | 11/2007 | Nakano et al. |
| 2012/0099727 A1* | 4/2012 | Marshall ............... H04L 9/0825 380/255 |
| 2013/0236014 A1 | 9/2013 | Senese et al. |
| 2014/0164776 A1* | 6/2014 | Hook ........................ H04L 9/14 713/171 |
| 2014/0380047 A1 | 12/2014 | Denning et al. |
| 2015/0095648 A1 | 4/2015 | Nix |
| 2016/0006729 A1* | 1/2016 | Yang .................. H04L 63/0428 713/156 |
| 2016/0065370 A1* | 3/2016 | Le Saint ............... H04L 9/0841 713/155 |
| 2016/0149899 A1 | 5/2016 | Abbott |
| 2016/0350238 A1* | 12/2016 | Ford .................... G06F 12/1408 |
| 2016/0373252 A1 | 12/2016 | Goldstein |
| 2017/0048066 A1* | 2/2017 | De Atley ............. H04L 9/0861 |
| 2017/0093565 A1 | 3/2017 | Yang et al. |
| 2017/0126642 A1 | 5/2017 | Basin |
| 2017/0142082 A1* | 5/2017 | Qian ....................... G06F 21/62 |
| 2018/0152299 A1 | 5/2018 | Rossi |
| 2019/0089532 A1 | 3/2019 | Lambert |

* cited by examiner

| Key ID | Public Key | Signature |
|---|---|---|
| $ID_0$ | $Q_0$ | $S_k(Q_0)$ |
| $ID_1$ | $Q_1$ | $S_k(Q_1)$ |
| $ID_2$ | $Q_2$ | $S_k(Q_2)$ |
| $ID_3$ | $Q_3$ | $S_k(Q_3)$ |
| $ID_4$ | $Q_4$ | $S_k(Q_4)$ |
| $ID_5$ | $Q_5$ | $S_k(Q_5)$ |
| $ID_6$ | $Q_6$ | $S_k(Q_6)$ |
| $ID_7$ | $Q_7$ | $S_k(Q_7)$ |
| $ID_8$ | $Q_8$ | $S_k(Q_8)$ |
| $ID_9$ | $Q_9$ | $S_k(Q_9)$ |
| $ID_{10}$ | $Q_{10}$ | $S_k(Q_{10})$ |
| $ID_{11}$ | $Q_{11}$ | $S_k(Q_{11})$ |
| $ID_{12}$ | $Q_{12}$ | $S_k(Q_{12})$ |
| $ID_{13}$ | $Q_{13}$ | $S_k(Q_{13})$ |
| $ID_{14}$ | $Q_{14}$ | $S_k(Q_{14})$ |
| $ID_{15}$ | $Q_{15}$ | $S_k(Q_{15})$ |
|  |  |  |
| $ID_n$ | $Q_n$ | $S_k(Q_n)$ |

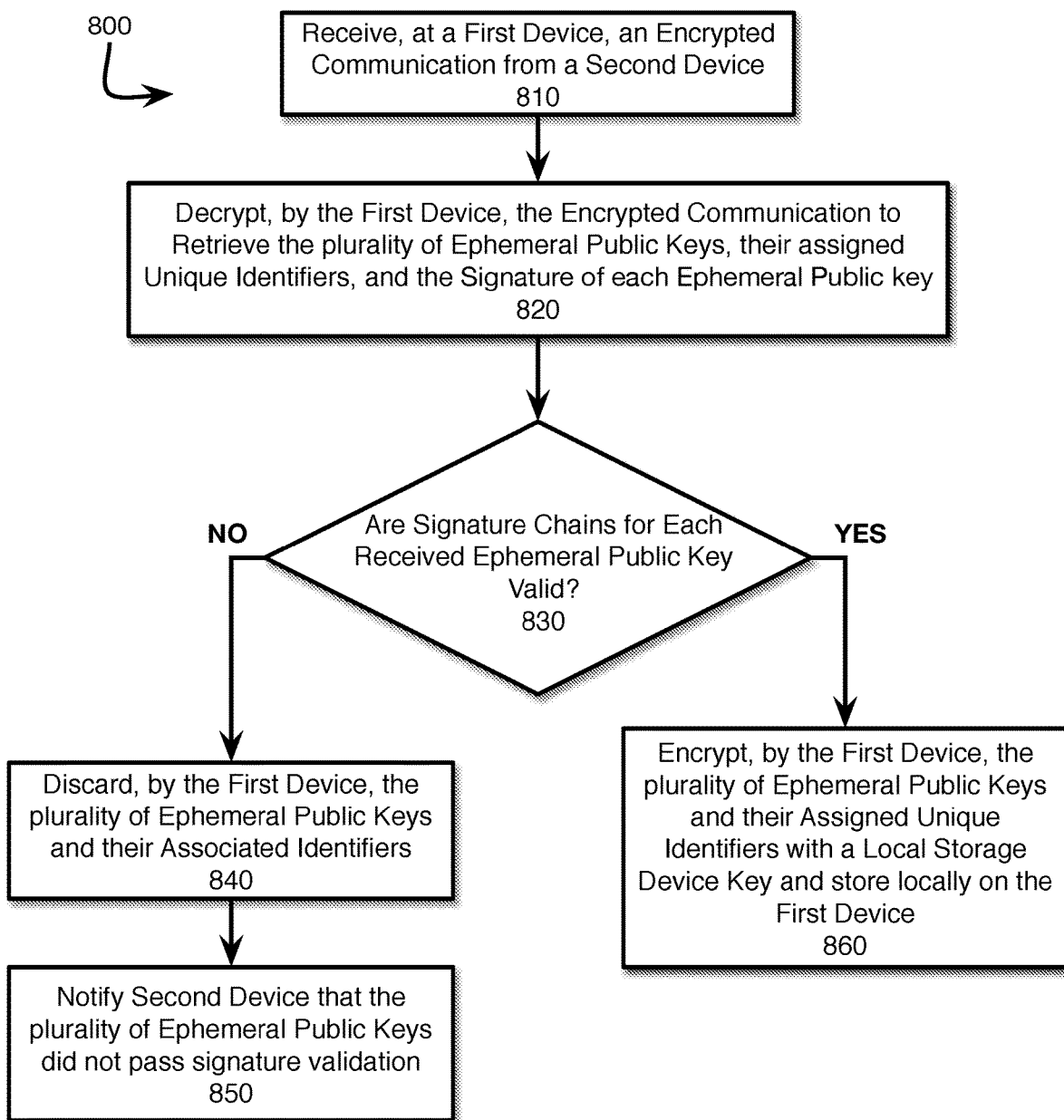

PROVISIONING EPHEMERAL KEY POOLS FOR SENDING AND RECEIVING SECURE COMMUNICATIONS

STATEMENT REGARDING FEDERALLY SPONSORED RESEARCH OR DEVELOPMENT

This invention was made with Government support under Contract No. 2014-14031000011 awarded by the Central Intelligence Agency. The Government has certain rights in the invention.

CROSS-REFERENCE TO RELATED APPLICATIONS

This application is related to U.S. Non-Provisional application Ser. No. 15/647,569, entitled, "Sending Secure Communications Using a Local Ephemeral Key Pool," filed concurrently herewith, and U.S. Non-Provisional application Ser. No. 15/647,576, entitled, "Generating Ephemeral Key Pools for Sending and Receiving Secure Communications," also filed concurrently herewith, the entireties of which are herein incorporated by reference.

BACKGROUND OF THE INVENTION

Key distribution centers allow users to upload keys to a repository so that others may access those keys to send the users encrypted messages. For example, a first user generates an asymmetric key pair and uploads the public key to a key distribution center. A second user subsequently requests the first user's public key from the key distribution center. After authenticating the second user, the key distribution center provides the second user with the first user's public key. Upon receiving the first user's public key, the second user encrypts data with the first user's public key received from the key distribution center and transmits the encrypted data to the first user. The first user receives the encrypted data and decrypts it with the first user's private key to access the data. Accordingly, key distribution centers play an important role in facilitating secure communications between the first user and the second user.

However, key distribution centers suffer from a technological problem in that the key distribution center represent a single source of failure. For example, if the key distribution center is unavailable, the first and second user no longer have the ability to exchange encrypted communications. In another example, the key distribution center may be compromised, which could allow a malicious user to conduct a man-in-the-middle attack and eavesdrop on the communications between the first and second users. Thus, there is the need for a technical solution that provides users with the ability to exchange encrypted communications without having to obtain a key from a key distribution center.

BRIEF SUMMARY OF THE INVENTION

The present disclosure describes a method, system, and non-transitory computer readable medium that includes instructions for providing encrypted communications when a key distribution center and communication server are unavailable.

According to one example, the present disclosure describes a method that includes transmitting a request for a user profile to a server from a first device. The first device determines whether a response to the request has been received, and, when no response has been received, retrieves information, such as an ephemeral public key and a key identifier, for the first user from a local storage. If information for the user is not present in the local storage, an error message is displayed. Next, the first device generates an encryption key that is used to encrypt a communication to the user. The encryption key may be derived from a set of pseudorandom bytes. Next, the first device may generate an ephemeral key pair. The generated ephemeral private key and the retrieved public key may be used to derive a key-encrypting key to encrypt the encryption key. Finally, the first device transmits the encrypted communication, the key identifier, the generated public key, and the encrypted encryption key to the user.

Another example describes a system that includes an interface that transmits a request to a server for a user's profile information, receives a response from the server that includes the requested information, and transmits and receives encrypted communications. The system also includes a processor that generates an encryption key, encrypts a communication using the encryption key, derives a key-encrypting key, encrypts the encryption key with the key-encrypting key, and decrypts encrypted communications from other users. The system also includes a memory that stores information about other users, as well as a first plurality of private keys and identifiers and a second plurality of public keys and identifiers.

The user information stored in the memory may include a username, at least one application identifier a user-signing key, and at least one application-signing key. In other examples, the system includes a crypto accelerator to assist the processor with cryptographic functions. The system may also include a display to provide decrypted communications to a user, as well as an input/output unit to allow the user to compose and respond to the communications.

In some examples, the processor may also generate a plurality of asymmetric key pairs, assign each key pair in the first plurality of asymmetric key pairs a unique identifier, and store the first plurality of private keys and identifiers in the memory. The interface may receive a plurality of public keys and identifiers from another user via the interface. Still in further examples, the processor may generate an asymmetric key pair and derive the key-encrypting key from the public key of the receiver and the generated private key.

According to another example, the present disclosure describes a non-transitory computer readable medium that includes instructions for transmitting a request for a user profile to a server from a first device. The instructions include determining whether a response to the request has been received, and, when no response has been received, retrieve information, such as a public key and a key identifier, for the first user from a local storage. If information for the user is not present in the local storage, the instructions display an error message. Next, the instructions generate an encryption key that is used to encrypt a communication to the user. The encryption key is derived from a set of pseudorandom bytes. Next, the instructions generate an ephemeral key pair; the generated ephemeral private key and the retrieved public key may be used to derive a key-encrypting key to encrypt the encryption key. Finally, the instructions transmit the encrypted communication, the key identifier, the generated public key, and the encrypted encryption key to the user.

The disclosure also includes a method that generates a first plurality of asymmetric key pairs, assigns a unique identifier to each pair of the first plurality of asymmetric key pairs, and transmits the first plurality of public keys and their associated unique identifiers to a first server. The method also includes generating a second plurality of asymmetric key pairs, assigning a unique identifier to each pair of the second plurality of asymmetric key pairs, and transmitting the second plurality of public keys and their associated unique identifiers to a second device.

In some examples, the method may generate a signature for each of the public keys of the first plurality of asymmetric keys and encrypt the first plurality of public keys, their assigned unique identifiers, and the signature for each of the public keys before transmitting them to the server. Each of the private keys of the first plurality of asymmetric keys may be encrypted with a local storage key and stored with their unique identifiers in local storage on the device.

Further examples include generating a signature for each of the public keys of the second plurality of asymmetric keys. The method then calculates an encryption key that is used to encrypt the second plurality of public keys, their assigned unique identifiers, and the signature for each of the public keys. The encrypted second plurality of public keys, their assigned unique identifiers, and the signature for each of the public keys are transmitted to a second user. In some examples, the method includes deriving a key-encrypting key, which encrypts the encryption key before it is transmitted to the second user with the second plurality of encrypted public keys, the encrypted unique identifiers, and the encrypted signature for each of the public keys. In additional examples, the method includes encrypting each of the private keys of the second plurality of asymmetric keys and their associated unique identifiers using a local storage key and storing them in a memory of the first device. In still further examples, the method may include receiving an encrypted communication from the second device and decrypting it, in part, using a private key from either the first plurality of asymmetric key pairs or the second plurality of asymmetric key pairs. Additionally, the method may include receiving a third plurality of public keys, a unique identifier for each of public key in the third plurality of public keys, and a signature for each of the third plurality of public keys from the second device. The method validates the signature for each public key in the third plurality of public keys and stores the third plurality of public keys and their unique identifier when the signatures for each public key in the third plurality of public keys are valid.

The disclosure also includes a system that includes an interface for transmitting a first plurality of public keys and their associated unique identifiers to a first server and transmitting a second plurality of public keys and their associated unique identifiers to a second device. The system may include a processor that generates a first plurality of asymmetric key pairs, assigns each pair of the first plurality of asymmetric key pairs a unique identifier, generates a second plurality of asymmetric key pairs, and assigns each pair of the second plurality of asymmetric key pairs a unique identifier. The system also includes a memory to store the first plurality of private keys and their identifiers and the second plurality of private keys and their identifiers.

In additional examples, the processor may sign each public key in the first plurality of public keys prior to transmitting them to the first server. Similarly, the processor may sign each public key in the second plurality of public keys prior to transmitting them to the second device. The interface receives a third plurality of public keys, a unique identifier for each of the public keys in the third plurality of public keys, and a signature for each of the third plurality of public keys from the second device. The processor validates the signature for each public key in the third plurality of public keys and stores the third plurality of public keys and their unique identifier for each public key in the third plurality of public keys in the memory when the signatures for each public key in the third plurality of public keys are valid.

According to another example, the disclosure describes a non-transitory computer readable medium that includes instructions for generating a first plurality of asymmetric key pairs, assigning a unique identifier to each pair of the first plurality of asymmetric key pairs, and transmitting the first plurality of public keys and their associated unique identifiers to a first server. The instructions may also include generating a second plurality of asymmetric key pairs, assigning a unique identifier to each pair of the second plurality of asymmetric key pairs, and transmitting the second plurality of public keys and their associated unique identifiers to a second device.

In some examples, the instructions may generate a signature for each of the public keys of the first plurality of asymmetric keys and encrypt the first plurality of public keys, their assigned unique identifiers, and the signature for each of the public keys before transmitting them to the server. Each of the private keys of the first plurality of asymmetric keys may be encrypted with a local storage key and stored with their unique identifiers in local storage on the device.

Further examples include instructions for generating a signature for each of the public keys of the second plurality of asymmetric keys. The instructions then calculate an encryption key that is used to encrypt the second plurality of public keys, their assigned unique identifiers, and the signature for each of the public keys. The encrypted second plurality of public keys, their assigned unique identifiers, and the signature for each of the public keys are transmitted to a second user. In some examples, the instructions include deriving a key-encrypting key, which encrypts the encryption key before it is transmitted to the second user with the second plurality of encrypted public keys, the encrypted unique identifiers, and the encrypted signature for each of the public keys. In additional examples, the instructions include encrypting each of the private keys of the second plurality of asymmetric keys and their associated unique identifiers using a local storage key and storing them in a memory of the device. In still further examples, the instructions may include receiving an encrypted communication from the second device and decrypting it, in part, using a private key from either the first plurality of asymmetric key pairs or the second plurality of asymmetric key pairs. Additionally, the instructions may include receiving a third plurality of public keys, a unique identifier for each of public key in the third plurality of public keys, and a signature for each of the third plurality of public keys from the second device. The instructions validate the signature for each public key in the third plurality of public keys and stores the third plurality of public keys and their unique identifier when the signatures for each public key in the third plurality of public keys are valid.

According to another aspect of the disclosure, a method includes receiving an encrypted communication from a second device and decrypting it to obtain a plurality of ephemeral public keys, their unique identifiers, and a signature for each public key of the plurality of ephemeral public keys. The method proceeds by validating the signature of each public key in the plurality of plurality ephemeral public keys and storing the plurality of ephemeral public keys when the signature of each public key in the plurality of ephemeral public keys is valid. The method may include encrypting the plurality of ephemeral public keys with a local storage device key prior to storing them.

Another example discloses a system that includes an interface for receiving an encrypted communication from a second device and a processor that decrypts the encrypted communication received to obtain a plurality of ephemeral public keys, their unique identifiers, and a signature for each public key of the plurality of ephemeral public keys and validates the signature of each public key in the plurality of the plurality ephemeral public keys. The system includes a memory to store the plurality of ephemeral public keys when the signatures of each public key are valid. In some examples, the processor may encrypt the plurality of ephemeral public keys with a local storage device key prior to storing them in the memory. In other examples, the interface is configured to transmit a request for a user profile of the second device to a first server. Furthermore, the processor determines whether a response to the request has been received from the first server, retrieves a first ephemeral public key and a key identifier from the memory when no response has been received, generates a first encryption key, derives a key-encrypting key using at least the first ephemeral public key; encrypts a first communication to the second device using the first encryption key and encrypts the first encryption key using the key-encrypting key. After the communication and the encryption key are encrypted, the interface transmits the encrypted communication, the key identifier, and the encrypted encryption key to the second device.

BRIEF DESCRIPTION OF THE DRAWINGS

Various embodiments of the invention are disclosed in the following detailed description and the accompanying drawings.

FIG. 4 show an example of a table of ephemeral public keys generated according to one example of the disclosure.

FIG. 8 illustrates a process for receiving the table of ephemeral public keys at a user device according to an example of the disclosure.

DETAILED DESCRIPTION

The present disclosure can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. These implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

Figure 1:
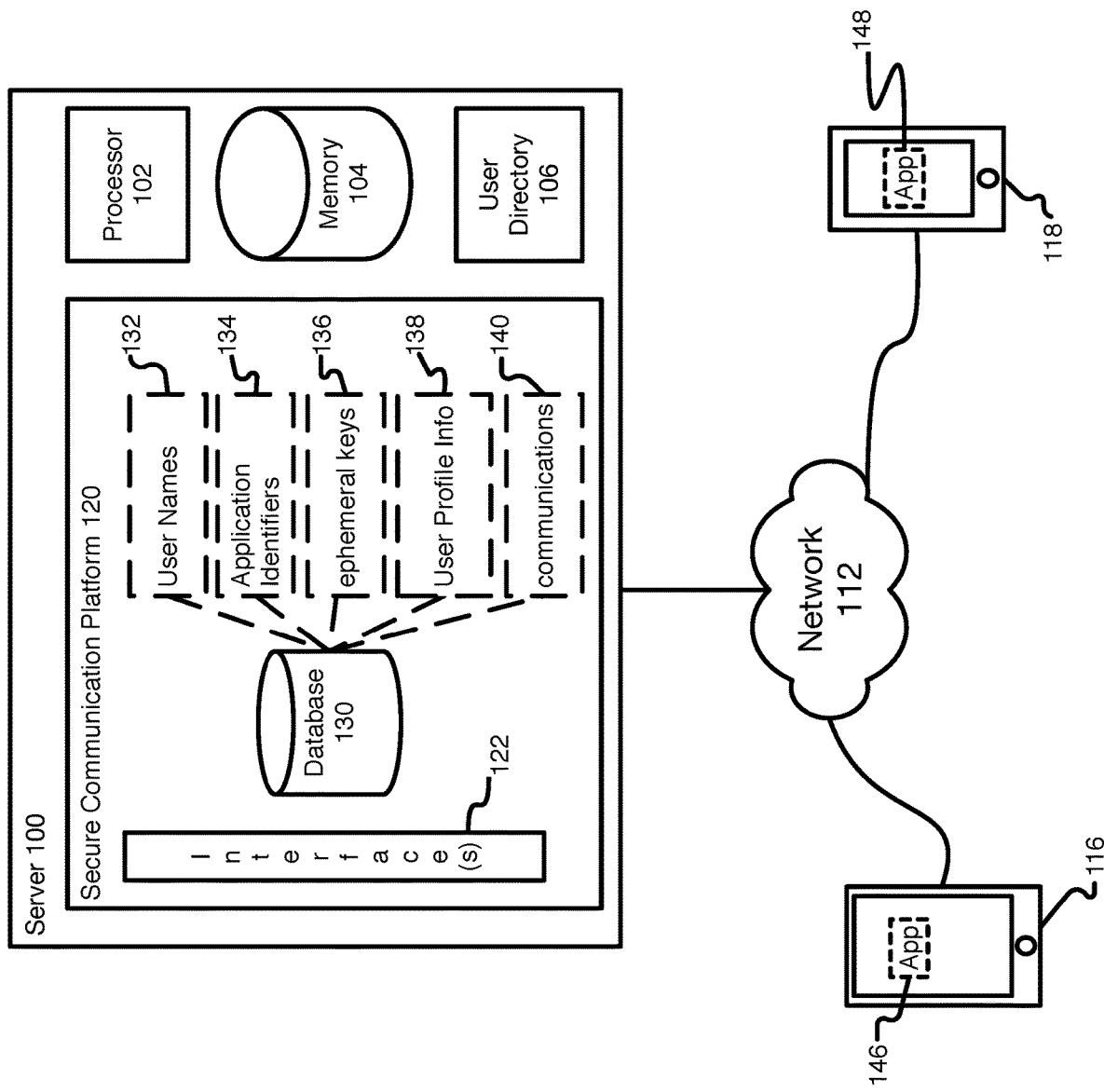
FIG. 1 illustrates an example of an environment where secure communications are exchanged.

FIG. 1 illustrates an embodiment of an environment in which secure communications are exchanged. Specifically, FIG. 1 shows a first client device 116 and a second client device 118 connected to secure communication platform 120, located on server 100, via network 112.

Typically, secure communications are exchanged using secure communication datagrams, which encapsulate a sender's communication. The datagram also allows information such as encryption information, hardware binding information, message security controls, and decryption information—for multiple receivers (as applicable)—to securely travel with the message. The secure communication datagram also provides cross-platform support so that users may communicate regardless of their operating systems (e.g., Linux, iOS, and Windows), smart phone platforms (e.g., iPhone, Android, Windows, Blackberry, etc.), and device types (e.g., mobile smart phones, tablets, laptops, desktops, etc.). Using the techniques described herein, only intended accounts on intended devices are able to decrypt the communications. Thus, for example, the secure communication platform 120 is unable to decrypt messages. As will further be described in more detail below, using the techniques described herein, communication participants can maintain a forward secret secure communication channel, whether communicating synchronously (e.g., where all participants are online or otherwise able to communicate with platform 120) or asynchronously (e.g., where at least one participant is offline or otherwise not in communication with platform 120).

As shown in FIG. 1, secure communication platform 120 may be implemented on server 100. Server 100 may include a processor 102, memory 104, user directory 106, and the secure communication platform 120. In this regard, server 100 may be a stand-alone server, a corporate server, or a server located in a server farm or cloud-computing environment. In some embodiments, the server 100 may be a cloud service provider running a virtual machine configured to provide secure communication platform 120 to an enterprise as a Software as a Service (SaaS).

Processor 102 may be any conventional processor capable of interacting with memory 104, user directory 106, and secure communication platform 120. In this regard, processor 102 may include a processor, a multiprocessor, a multicore processor, or any combination thereof. Alternatively, processor 102 may be a dedicated controller, such as an Application Specific Integrated Circuit (ASIC) or Field Programmable Gate Array (FPGA).

Memory 104 stores information accessible by processor 102, including instructions and data that may be executed or otherwise used by the processor 102. Memory 104 may be any type of media capable of storing information accessible by the processor, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 104 may include short term or temporary storage as well as long term or persistent storage. According to some embodiments, memory 104 may include a storage area network (SAN) accessible by the secure communication platform 120.

User directory 106 may be any database or table capable of providing directory services. For example, user directory may include a corporate directory that include employees' first and last names, usernames, email address, phone numbers, department information, etc. Alternatively, user directory 106 may be a database or table to maintain user information for users of secure communication platform 120. In this regard, user directory 106 may be encrypted. In some embodiments, user directory 106 may serve as a secure directory that includes a table of hashed usernames, a table of application identifiers, and a table of device identifiers for a secure communication application. Accordingly, user directory 106 may be used to share information about users, systems, networks, services and applications. According to some embodiments, the user directory 106 may include a Lightweight Directory Access Protocol (LDAP).

Although FIG. 1 illustrates processor 102, memory 104, user directory 106, and secure communication platform 120 as being located on server 100, processor 102 and memory 104 may comprise multiple processors and memories that may or may not be stored within the same physical housing. For example, memory 104 may be a hard drive or other storage media located in a server farm of a data center, such as a storage area network (SAN). Accordingly, references to a processor, a computer, or a memory will be understood to include references to a collection of processors or computers or memories that may or may not operate in parallel. Further, the user directory 106 may be located in a separate physical housing from processor 102 and memory 104. Moreover, secure communication platform 120 may be distributed across multiple servers.

Secure communication platform 120 may be configured to facilitate the exchange of communications for users of a secure communication application. As used herein, "communications" and "messages" may be used interchangeably to describe a variety of telecommunications, including: text messages, chat room messages, control messages, commands, e-mails, documents, audiovisual files, Short Message Service messages (SMSes), audio calls, voice calls (i.e., VOIP), and video calls. Additionally, the content of the messages and/or communications may pertain to electronic transactions, such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. The exchange of messages and/or communications is explained in further detail below.

Secure communication platform 120 may provide encrypted communications that easily integrate into and secure existing systems while providing compliant and secure communications. In this regard, secure communication platform 120 may integrate with existing identity systems, such as user directory 106. Further, secure communication platform 120 may include built-in support for enterprise data retention and support systems.

Secure communication platform 120 may also include database 130. Database 130 may be a relational database that stores information in a variety of tables. In this regard, database 130 may include a record for each user of platform 120 to allow users to find other users and communicate with others. Accordingly, database 130 may include a table of user names 132, a table of application identifiers 134, a pool of ephemeral keys 136, and a table of user profile information 138. User profile information may include a privacy mode set by the user and one or more privacy lists to control with whom the user may communicate. Additionally, database 130 may include a table of communications 140. That is, the secure communication platform may store communications for a predetermined time in table 140. For example, when a communication is received, the secure communication platform may store the communication in the table of communications 140 and provide an alert, such as a push notification, to the receiver. Accordingly, a receiver may access the secure communication platform to obtain his or her communications stored in table 140. In preferred embodiments, table 140 may store communications for 30 days; however, this may be adjusted, as needed, based on industry standards and/or to comply with regulatory schemes.

While a database is shown in FIG. 1, other techniques can be used to store the information used by platform 120 to facilitate the exchange of encrypted communications. For example, the table of communications may be stored in a separate storage, such as memory 104, instead of being stored within database 130. Alternatively, the information contained in the database 130 may be divided between database 130 and user directory 106. In this regard, database 130 and user directory 106 may interface to exchange information. Further, additional information can be securely stored on platform 120, whether in database 130 or another appropriate location.

Secure communication platform 120 may include one or more interface(s) 122 for communicating with the first client device 116 and the second client device 118. As one example, platform 120 may provide an application programming interface (API) configured to communicate with applications installed on client devices. Platform 120 may also provide other types of interfaces, such as a web interface, or stand-alone software programs for desktops and laptops, running on various Operating Systems (OSes). The web interface may allow users of client devices to exchange communications securely (whether with one another or other users), without the need for a separately installed communication application. The standalone software program may allow users to exchange secure communications via software that is downloaded by each user. According to some embodiments, platform 120 may make available a master clock time available via the one or more interface(s) 122. The master clock time may be used by client applications to enforce secure time-to-live (TTL) values of messages. The TTL values can be used to enforce (e.g., on behalf of a message sender) time constraints on communication access (e.g., by a receiver).

Users of client devices, such as client devices 116 and 118, may communicate securely with one another using the techniques described herein. For example, the first client device 116 and the second client device 118 may make use of the secure communication platform 120 and the techniques described herein via a secure communication application 146 and 148, respectively. As shown in FIG. 1, client devices may be mobile devices, such as a laptops, smart phones, or tablets, or computing devices, such as desktop computers or servers. As noted above, the secure communication application described herein allows cross-platform communications, thereby allowing users of various devices to communicate seamlessly. Further, each user may have different instances of the communication application across multiple devices. That is, the user of device 116 may be able to receive messages on both device 116 as well as on any other devices that the user may have that includes a copy of the secure communication application, such as a laptop. In some embodiments, client devices 116 and 118 may be the users' personal devices (i.e. a bring your own device (BYOD) scenario). Alternatively, client devices may include other types of devices, such as game consoles, camera/video recorders, video players (e.g., incorporating DVD, Blu-ray, Red Laser, Optical, and/or streaming technologies), smart TVs, and other network-connected appliances, as applicable.

Communications between users of client devices 116 and 118 may be exchanged via network 112. Network 112 may include various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing.

As will be described in greater detail below, processor 102 may perform a plurality of tasks on behalf of secure communication platform 120. Furthermore, whenever platform 120 is described as performing a task, either a single component or a subset of components or all components of platform 120 or enterprise server 100 may cooperate to perform the task. For example, platform 120 may designate one of the keys in a pool of ECDH public keys received from a user of a device as a "reserve" key. Another task performed by platform 120 may include facilitating the addition of new keys to a user's pool of public keys as they are used. Yet another task performed by platform 120 may include dynamically adjusting the size of a user's pool of public keys as needed.

Figure 2:
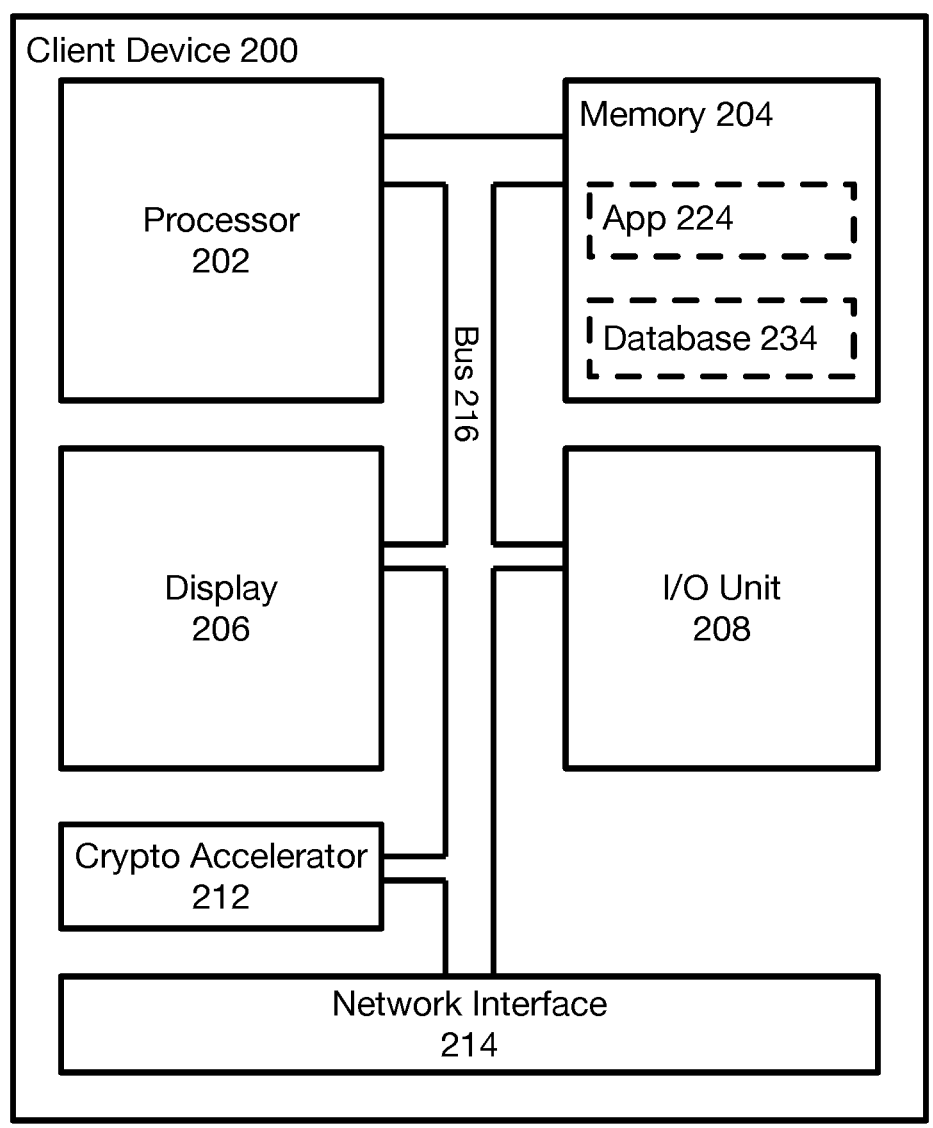
FIG. 2 shows a client device that transmits and receives encrypted communications using the secure communication application of the current disclosure.

To make use of the secure communication platform described above, users must download and install the secure communication application on their client device FIG. 2A illustrates an exemplary client device 200 that may access the security platform 120 via a secure communication application. In this regard, client device 200 includes a processor 202, a memory 204, a display 206, an I/O unit 208, a cryptographic ("crypto") accelerator 212, and a network interface 214 all interconnected by bus 216.

Processor 202 may be any processor capable of interacting with the components of client device 200. For example, processor 202 may include a processor, multiprocessors, multicore processor, a dedicated controller, such as an ARM processor, an ASIC, or an FPGA, or any combination thereof. According to some examples, processor 202 may be configured to generate a first plurality of asymmetric key pairs, assign each pair of the first plurality of asymmetric key pairs a unique identifier, generate a second plurality of asymmetric key pairs, and assign each pair of the second plurality of asymmetric key pairs a unique identifier. Processor 202 may also sign each public key in the first and second plurality of public keys before they are transmitted. In other examples, processor 202 may be configured to decrypt an encrypted communication received from a second device to obtain a plurality of ephemeral public keys, their unique identifiers, and a signature for each public key of the plurality of ephemeral public keys and validate the signature of each public key in the plurality of the plurality ephemeral public key. Processor 202 may also be configured to encrypt the plurality of ephemeral public keys with a local storage device key. IN still yet other examples, processor 202 may be configured to determine whether a response to a request has been received from a first server; retrieve a first ephemeral public key and a key identifier from a memory when no response has been received from the first server; generate a first encryption key; deriving a key-encrypting key using at least the first ephemeral public key; encrypt a first communication to a second device using the first encryption key; and encrypt the first encryption key using the key-encrypting key.

Memory 204 may store information accessible by processor 202, including instructions and data that may be executed or otherwise used by the processor 202 and/or crypto accelerator 212. For example, memory 204 may store instructions, such as application 224. In preferred embodiments, application 224 may be a secure communication application that provides users with the ability to participate in voice and video calls, share encrypted content, and exchange encrypted communications. Encrypted communications may include direct communications (e.g., one-to-one communications between a sender and receiver), group chats, or secure chat room communications. Data stored by memory 204 may include database 234. Database 234 may be encrypted via an encryption algorithm, such as Advanced Encryption Standard (AES), and a 256-bit key, referred to hereinafter as a local storage key. In some embodiments, database 234 may store information related to secure communication application 224. For example, database 234 may index information related to the secure communication application, such as key information (e.g. a user signing key, an application signing key, etc.), user information (e.g., username, application identifier, etc.), friend information, and communications. In this regard, communications transmitted and received by the secure communication application, including a message identifier, a hash of the sender's username, a hash of the sender's application identifier, a hash of the receiver's username, a hash of the receiver's application identifier, the communication encryption key, and a timestamp of each communication may be stored in database 234. Memory 204 may also store a plurality of ephemeral keys received from a second user that would allow the first and second user to exchange encrypted communication if security platform 120 were unavailable or non-responsive. Accordingly, memory 204 may be any type of media capable of storing the information above, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 204 may include short term or temporary storage as well as long term or persistent storage.

Display 206 may be any electronic device capable of visually presenting information. In mobile devices, such as smart phones and tablets, display 206 may be a touchscreen display. Accordingly, display 206 may be integrated with I/O unit 208 to detect user inputs, as well as output data. In computing devices, display 206 may be an output, such as a VGA, DVI, or HDMI output, configured to connect to a monitor. In operation, display 206 may be configured to provide the decrypted communications to a second user or display an error message when receiver information is unobtainable, either from security platform 120 or locally on the sending device.

I/O unit 208 may be capable of receiving input from a user. As noted above, the I/O unit 208 may work with touchscreen displays to receive input from a user. Alternatively, the I/O unit may be an interface capable of interacting with input and output devices, such as keyboards, mice, monitors, printers, etc. In operation, the input/output unit may be configured to allow a user to compose a communication before it is encrypted and transmitted to a receiver. Additionally, the I/O unit 208 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Crypto accelerator 212 may be dedicated hardware, software, or any combination thereof that is capable of performing cryptographic operations, such as key generation, random number generation, encryption/decryption, signature generation, signature verification, etc. In preferred embodiments, crypto accelerator 212 is a dedicated processor configured to perform cryptographic operations on behalf of processor 202. In this regard, application 224 may make use of crypto accelerator 212 to provide the secure communication functions described in greater detail below.

Network interface 214 may be dedicated hardware, software, or any combination thereof that is capable of connecting client device 200 to network 112. In this regard, network interface 214 may include various configurations and use various communication protocols including Ethernet, TCP/IP, ATM, cellular and wireless communication protocols (e.g. 802.11, LTE), instant messaging, HTTP and SMTP, and various combinations of the foregoing. Network interface 214 may be configured to transmit a first plurality of public keys and their associated unique identifiers to a first server and transmit a second plurality of public keys and their associated unique identifiers to a second device. In other examples, interface 214 may be configured to transmit a request to a first server for a first user's profile information, receive a response from the first server that includes the first user's profile information, transmit a first encrypted communication to the first user, and receive a second encrypted communication from the first user.

After installing the secure communication application, a user must enroll themselves and their first device with the secure communication platform. User enrollment includes generating a unique username. In this regard, a username may be negotiated with secure communication platform 120 to ensure that every user has a unique username. In alternative examples, the user's username may be an identifier assigned by a third party, such as a system administrator, such as a corporate, enterprise, or government login. In other examples, the username may be a random identifier assigned to the user. The random identifier may be generated by the secure communication application and confirmed by the secure communication platform. Alternatively, the random identifier may be assigned to the user by the secure communication platform.

Once a username has been selected, the secure communication application generates a first asymmetric key pair using an asymmetric derivation function. In preferred embodiments, the first asymmetric key pair is generated according to elliptic curve cryptography (ECC) using a first P-521 curve. Next, the secure communication application generates a first symmetric key that is used to encrypt account-level backups of the secure communication application. For example, the first symmetric key may be used to encrypt account information using any symmetric encryption algorithm, such as AES-GCM, and store the encrypted account information on the secure communication platform. Next, the secure communication application generates a second symmetric key to encrypt data stored on the user's device according to any symmetric encryption algorithm, preferably AES-GCM. Finally, the secure communication application generates a third symmetric key to encrypt user information, including a plurality of keys that are used to identify the user, that is uploaded to and stored on the secure communication platform. User enrollment is completed when the secure communication application transmits the first public key and the username to secure communication platform 120, which creates a new entry for the user in database 130.

After completing user enrollment, the user must enroll their device with the secure communication platform 120. Device enrollment occurs any time a user logs in to the secure communication application on a new device, including on the first device after user enrollment occurs. Device enrollment begins in block with the secure communication application generating a second asymmetric key pair. In preferred embodiments, the second asymmetric key pair is generated according to ECC using a second P-521 curve. The second asymmetric key pair is unique to the instance of the secure communication application. In this regard, if the user has the secure communication application installed on several devices, each device will have its own unique second asymmetric key, while the first asymmetric key pair will be the same for each instantiation of the secure communication application. Next, the secure communication application derives a local storage device key. The local storage device key protects data stored locally on the user's device via symmetric encryption. In some examples, the local storage device key is generated by combining the second symmetric key and device data through a key derivation function. In preferred embodiments, the key derivation function is an HMAC key derivation function with SHA-256 as the underlying hash function. In subsequent installations, the secure communication application obtains second symmetric key from the secure communication platform. Device data includes device-specific data and/or identifiers derived from installed hardware or operating system sources that are unique and constant across application installs. For example, device data may include hard drive identifiers, motherboard identifiers, CPU identifiers, and MAC addresses for wireless, LAN, Bluetooth, and optical cards, configuration information, or a combination of the foregoing. Next, the secure communication application generates an application identifier. The application identifier is a random identifier that is generated by hashing a set of pseudorandom bytes using SHA256. The application identifier is used by the secure communication platform to identify the secure communication application and the device with which it is associated. Subsequently, the secure communication application generates a first signature of the second public key using the first private key. In preferred embodiments, the secure communication application generates the signature according to Elliptic Curve Digital Signature Algorithm (ECDSA). Finally, the application identifier, the second public key, and the first signature of the second public key are transmitted to the server. The secure communication platform stores this information within the user's profile on the secure communication platform.

Figure 3:
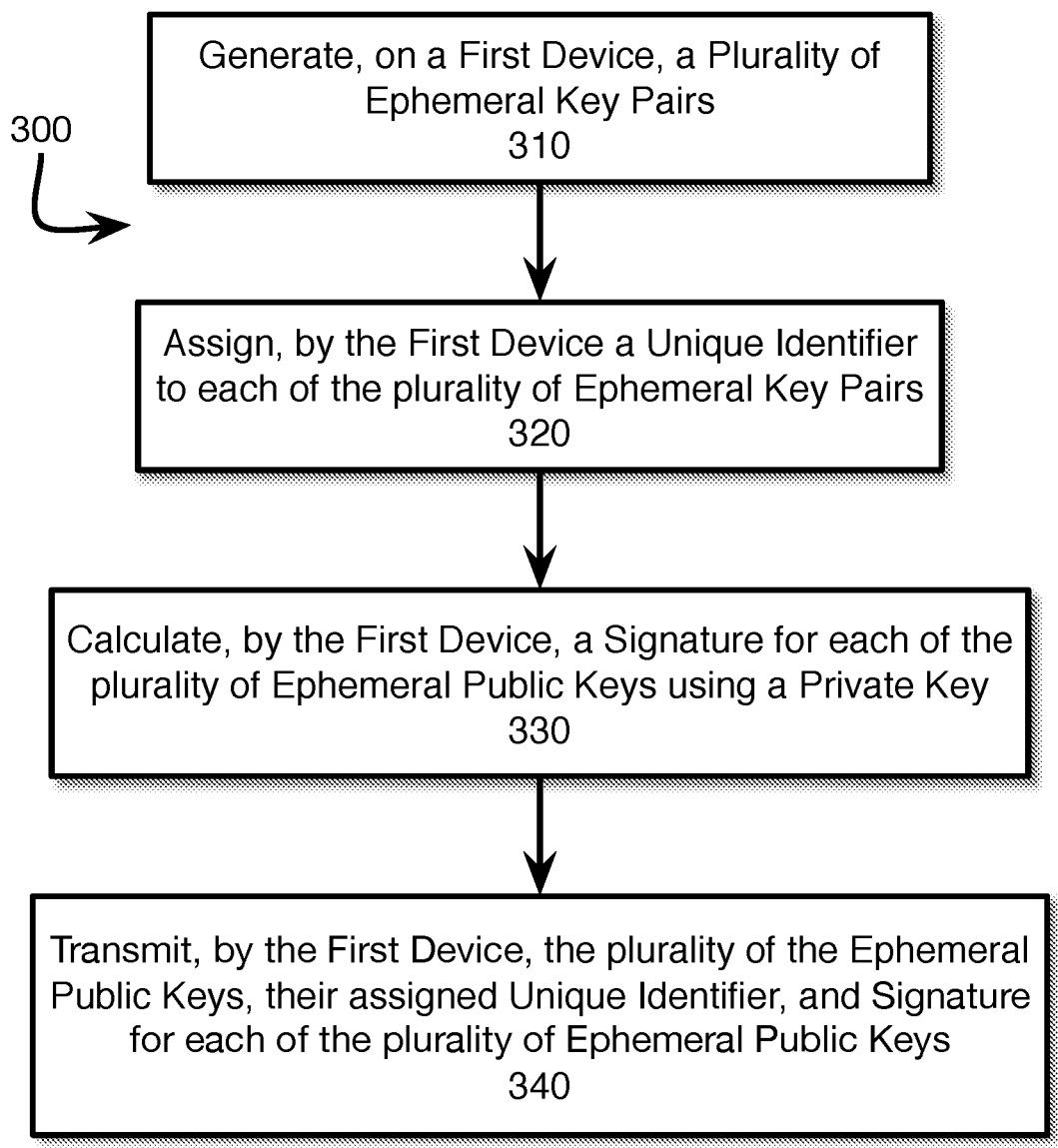
FIG. 3 illustrates an exemplary process for generating a pool of ephemeral asymmetric key pairs.

After both user and device enrollment have been completed, each instance of the secure communication application creates a pool of asymmetric key pairs. These key pairs are used as part of a key agreement protocol and enable the secure communication application to begin receiving encrypted communications. As the secure communication application begins receiving encrypted communications, the pool of asymmetric key pairs will become depleted and need to be replenished. FIG. 3 shows a method 300 for generating the pool of ephemeral asymmetric key pairs. As used herein, ephemeral asymmetric key pairs, ephemeral public keys, and ephemeral private keys means a short-term key or key pair or a single use key or key pair.

In block 310, the secure communication application on a first device generates a pool of ephemeral, asymmetric key pairs. In preferred embodiments, the ephemeral asymmetric key pairs are generated according to ECC according to a third P-521 curve. In block 320, a unique identifier is assigned to each key pair. Next, in block 330, the secure communication application calculates a signature for each of the ephemeral public keys using the second private key associated with the user's secure communication application. The signatures for each ephemeral public key may be generated according to any standard signature generation algorithm, including ECDSA. In block 340, each of the ephemeral public keys, along with its unique identifier and corresponding signature, are uploaded to the server. Accordingly, the server stores the pool of ephemeral public keys in the user's profile on the secure communication platform. The corresponding pool of ephemeral private keys are encrypted with the local storage device key and are stored securely, along with their assigned unique identifiers, on the user's device.

As noted above, the process 300 is initially performed after the user's first user enrollment and device enrollment. The process 300 may be subsequently repeated for each new device enrollment. Additionally, process 300 may be performed to send a pool of ephemeral public keys to an individual receiver to allow the sender and receiver to communicate using peer-to-peer (P2P) techniques. Alternatively, the pool of ephemeral public keys may be used as a reserve pool of ephemeral public keys when the sender is unable to obtain an ephemeral public key from the secure communication platform. The method shown in FIG. 3 may be repeated as necessary as the pool of asymmetric keys becomes depleted since the public key will be deleted from the pool of available keys each time it is used in an encrypted communication exchange. Removing the public key from the pool of available public keys may occur on the sender's device, when the key is selected from a plurality of keys maintained on the sender's device, or on the secure communication platform after the secure communication platform provides the ephemeral public key to a sender.

FIG. 4 shows an example of a plurality of ephemeral public keys generated according to the process 300. The table 400 includes three columns. Column 410 is the unique identifier assigned to each ephemeral key pair, column 420 shows includes the ephemeral public keys, and column 430 illustrates the signature of each ephemeral public key generated using the second private key. As noted above, the plurality of ephemeral public keys may be transmitted to the secure communication platform for distribution to other users. Alternatively, the plurality of ephemeral public keys may be transmitted to another user for direct communications between the first and second users. According to these examples, the plurality of ephemeral public keys may enable the first and second users to communicate using the encryption techniques described herein in a peer-to-peer protocol. In these examples, the pool of ephemeral public keys maintained by the secure communication platform may be used for an initial encrypted transmission and then as a reserve set of ephemeral public keys.

Figure 5A:
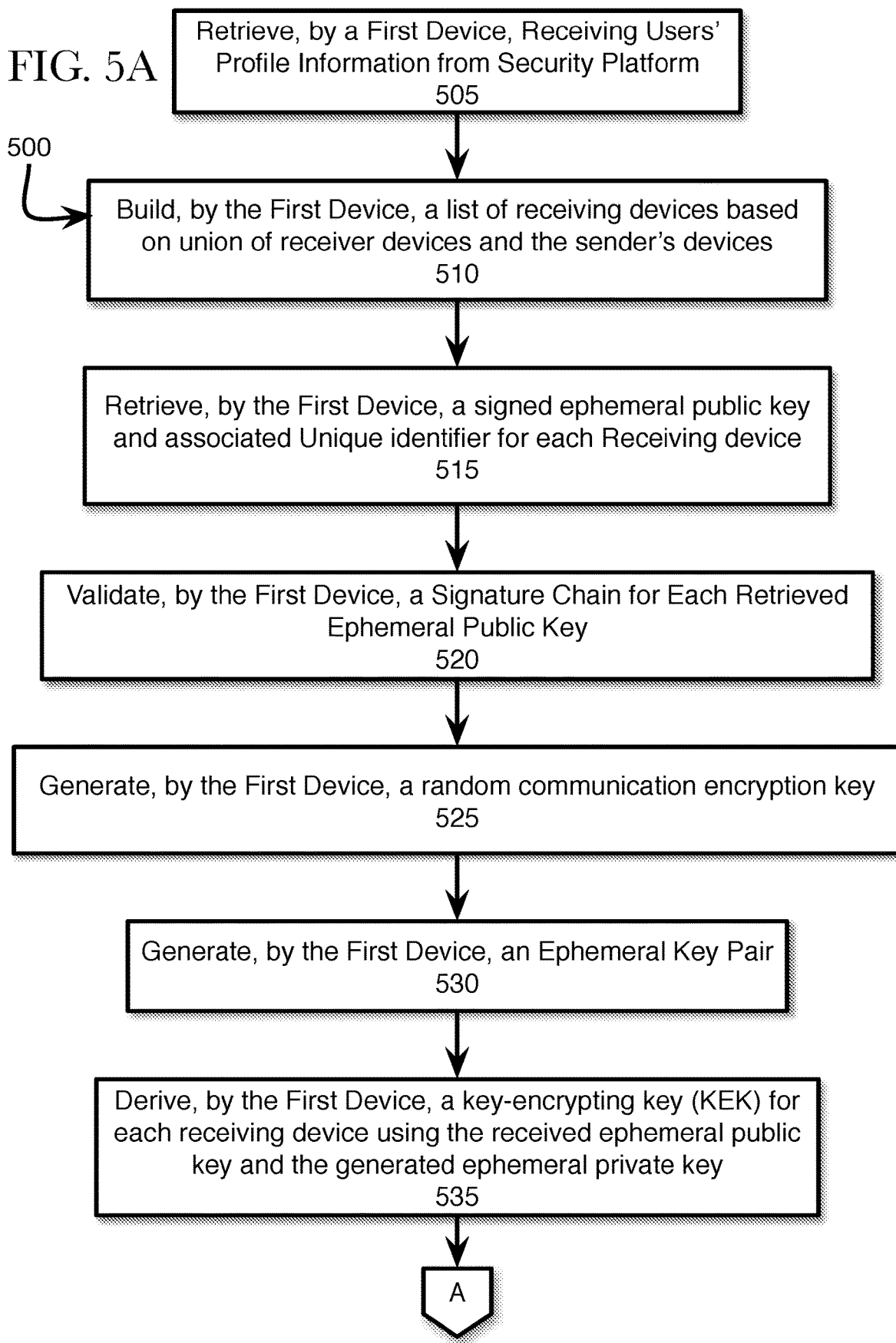
FIGS. 5A and 5B illustrate a process for transmitting an encrypted communication according to an example of the disclosure.
Figure 5B:
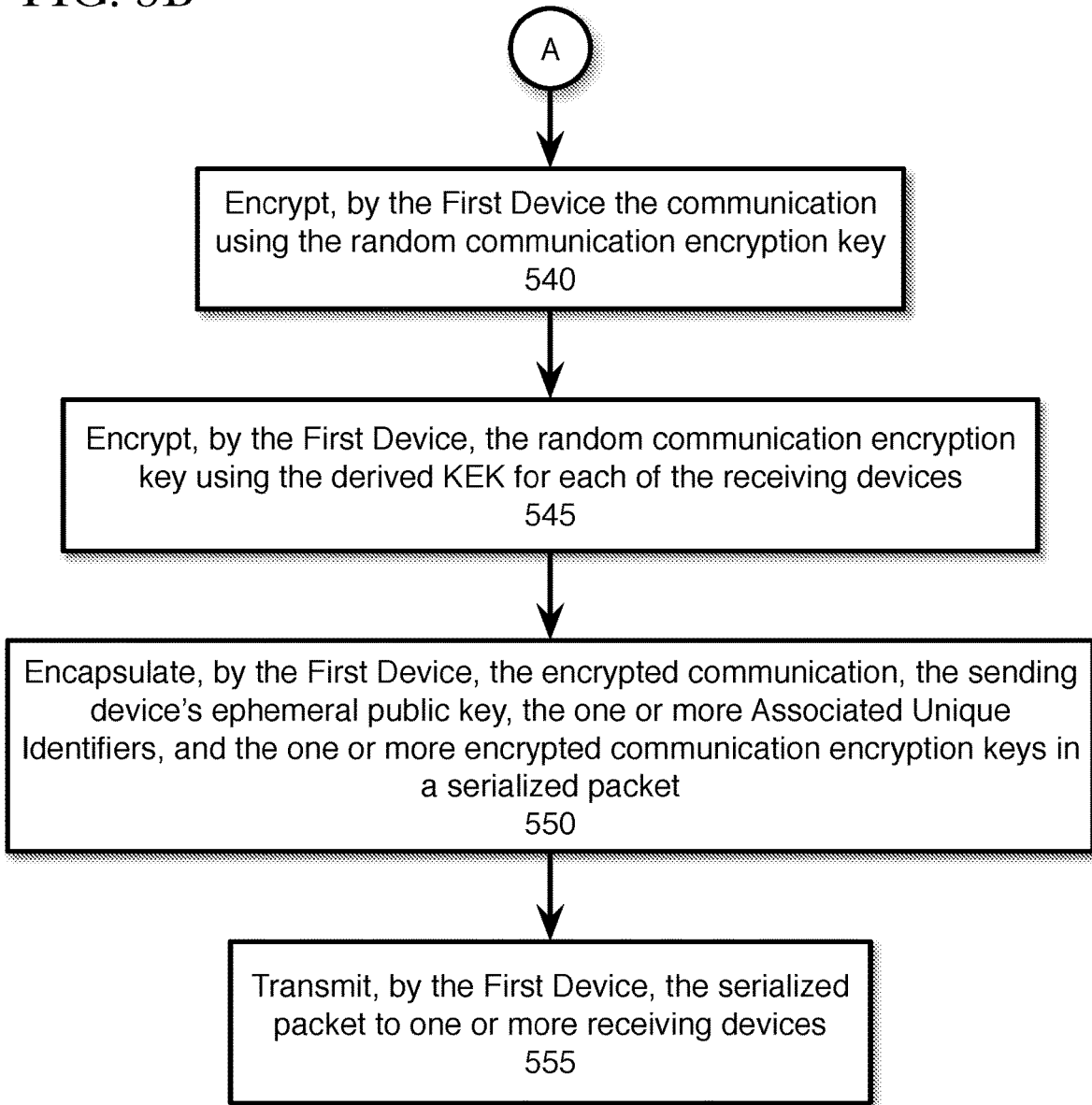

The secure communication provided by the secure communication platform can be best understood as providing device-to-device communication rather than user-to-user communication. As discussed above, a single user may have the secure communication applications executing on multiple associated devices. For the purposes of transmitting a communication, each instance of the secure communication application could be considered a device. For example, a first user with two devices who sends a message to a second user with three devices is sending an encrypted message to four devices—the three device devices associated with the second user, and the first user's second device. FIGS. 5A and 5B illustrate a process 500 for transmitting an encrypted communication per this principle.

In block 505, a first device's secure communication application retrieves one or more receiving users' profile information from the secure communication platform 120. In this regard, the first device's secure communication application may request the receiving users' profile information from the secure communication platform 120. This may occur, for example, when the user of the first device begins composing the communication. The user profile information includes the user's username, a list of the user's device devices, the second public key for each device, and the signature of the second public key for each receiving device. Next, the first device's secure communication application builds a list of receiving devices based on a union of the receiver devices and the sender's devices in block 510. In block 515, the first device's secure communication application retrieves a signed ephemeral public key and its associated unique identifier. In examples where the first and second devices are communicating P2P, the first device's secure communication application retrieves the signed ephemeral public key and its associated unique identifier from local storage on the first device. In other examples, such as the first time the sender and receiver communicate, the first device's secure communication application may retrieve the signed ephemeral public key and its associated unique identifier for each of the receiving devices from the secure communication platform 120. As discussed in greater detail below, the initial communication may include a plurality of ephemeral public keys, their associated identifiers, and a signature of each of the ephemeral public keys that allow P2P communications between the sender and receiver. Subsequent communications may use the plurality of ephemeral public keys transmitted in the initial communication. These subsequent communications may include replenishments to the plurality of ephemeral public keys. According to some embodiments, the signed ephemeral public key and the associated unique identifier may be obtained along with the receiving users' profile information.

In block 520, the first device's secure communication application validates the signature chain for each ephemeral public key received from the secure communication platform. In this regard, the signature of the ephemeral public key is authenticated according to a signature verification algorithm, such as ECDSA, using the second public key; the signature of the second public is verified using the first public key; and the username corresponds to an expected user identity. If the signature chain is invalid, the secure communication application may request the one or more receiving users' profile information from the secure communication platform. Alternatively, the secure communication application may discard the communication and refuse to communicate with the one or more receiving devices with the invalid signature chain. If the signature chain is valid, then the secure communication application continues preparing the communication to send to the one or more receiver devices.

In block 525, the first device generates a random communication encryption key. In preferred embodiments, the random communication encryption key is a 256-bit key derived from a first set of pseudorandom bytes. Alternatively, the random communication encryption key may be generated by applying a key derivation function (e.g. HKDF) to the first set of pseudorandom bytes derived from a sending client's device. The first set of pseudorandom bytes may be derived from ephemeral environmental noise obtained from device drivers and other kernel operations. For example, data from the various sensors (e.g., the at least one accelerometer, Global Positioning Satellite (GPS) system, magnetometer, proximity sensor, ambient light sensor, moisture sensor, and gyroscope) may be used as the first set of pseudorandom bytes.

In block 530, the first device's secure communication application generates an ephemeral key pair. In block 535, the first device's secure communication application calculates a key-encrypting key (KEK) for each receiving device. The key-encrypting key is calculated by deriving a shared secret using the ephemeral private key the sending secure communication application generated and the receiving device's ephemeral public key received from the secure communication platform. In preferred embodiments, the shared secret is derived according to Diffie-Hellman. The shared secret and the receiving device's application identifier are inputted into a key derivation function to derive a key-encrypting key. By encrypting the random communication encryption key with the key-encrypting key, the encryption communication is effectively bound to the receiver's secure communication application. This improves security by allowing only the receiving device to access the communication. That is, a receiver would not be able to transfer the communication from one device to another and still be able to decrypt the message since the keys used to generate the key-encrypting key are unique to the specific installation of the secure communication application. Block 535 is repeated for each of the one or more receivers' devices.

After calculating the key-encrypting key for each of the one or more receivers' devices, the first device's secure communication application encrypts the communication using the random communication encryption key. In preferred examples, the communication is encrypted via a symmetric encryption algorithm using the random communication encryption key. In block 545, the communication key is encrypted using the derived KEK for each of the receiving devices. After the random communication encryption key has been encrypted with the KEK derived for each receiving device, process 500 proceeds to block 550, where the first device's secure communication application creates a serialized packet that includes the encrypted communication, the ephemeral public key that the first device's secure communication application generated in block 530, the one or more unique identifiers for the receiver's public key received from secure communication platform, and the one or more encrypted communication encryption keys. In block 555, the first device's secure communication application transmits the serialized packet to the secure communication platform for distribution to the one or more receiving devices. In this way, the secure communication platform receives a single packet and distributes the single packet to the one or more receiving devices.

Figure 6:
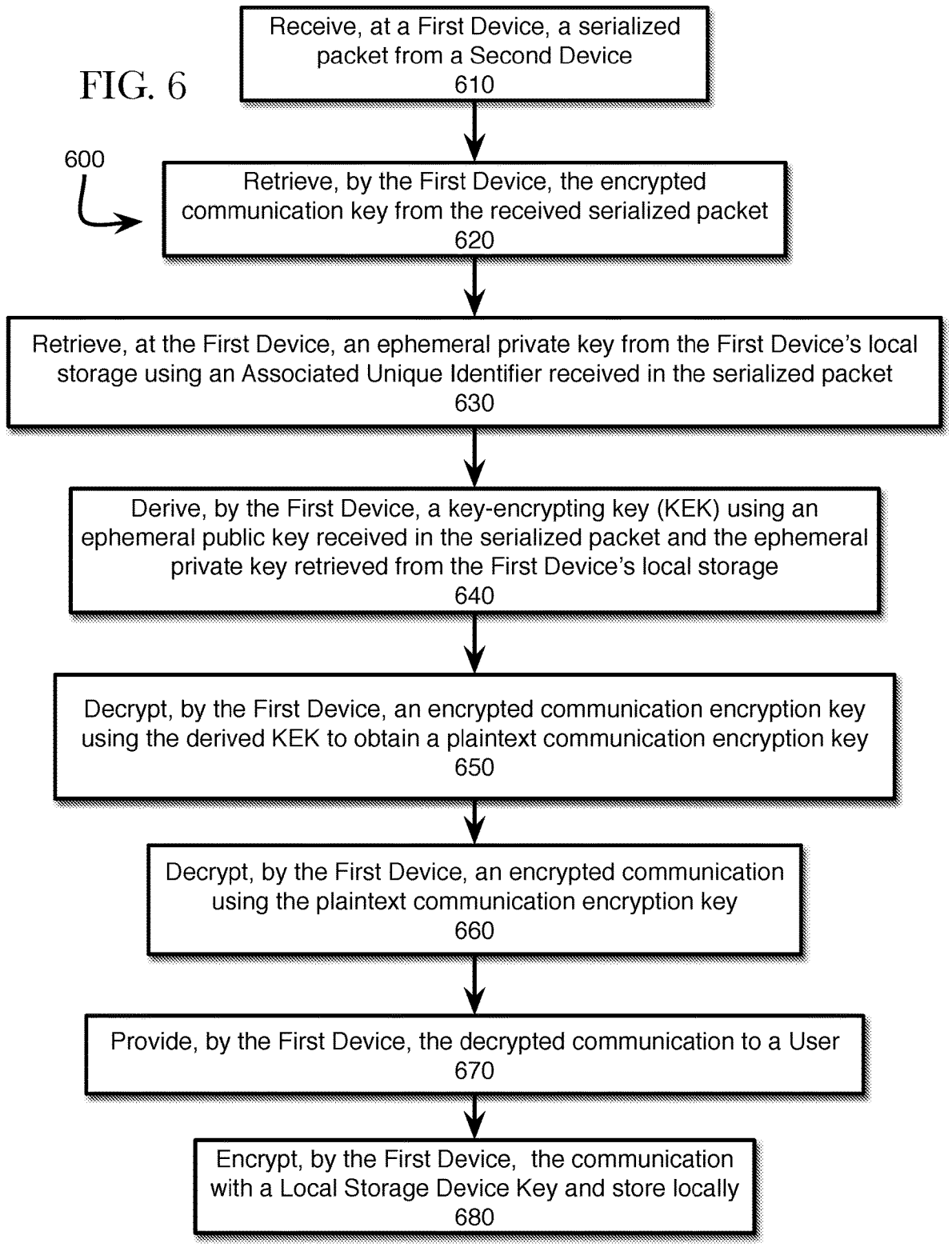
FIG. 6 shows a method for decrypting a received encrypted communication according to one example of the disclosure.

The secure communication platform provides each of the one or more receiving devices with an alert, such as a push notification, that they have received a new communication. The secure communication applications contact the secure communication platform and download the new communication to their devices. FIG. 6 illustrates a method 600 for receiving and decrypting an encrypted communication on a receiving device.

In block 610, the first device (e.g. receiving device) receives a serialized packet from a second device (e.g. sending device). Receiving the serialized packet includes retrieving the serialized packet from the secure communication platform in response to receiving an alert or notification. Additionally, the first device is responsible for identifying the appropriate key material to decrypt the communication content. If this is the first time the sending device and the receiving device have communicated, the first device may obtain information about the second device from the secure communication platform, such as the application identifier of the sending device, the username, and user profile information of the sending device. The first device may store this information in database 234 for subsequent communication exchanges.

After obtaining the communication and information about the sender, the secure communication application on the first device uses its application identifier to retrieve the encrypted communication key and the unique identifier of the first device's ephemeral key pair from the received serialized packet in block 620. In block 630, the first device's secure communication application uses the unique identifier to identify and retrieve the ephemeral private key from a local storage that corresponds to the ephemeral public key used by the second device to derive the KEK. According to some examples, the first device's secure communication application may decrypt the ephemeral private key retrieved from local storage using the first device's local storage device key. Next, the secure communication application on the first device calculates the key-encrypting key in block 640. Specifically, the first device calculates a shared secret using the first device's ephemeral private key and the second device's ephemeral public key. The shared secret and the first device's application identifier are inputted to a key derivation function to generate the key-encrypting key. In block 650, the first device's secure communication application decrypts the encrypted communication encryption key. In block 660, the decrypted communication encryption key is used to decrypt the message. In block 670, the first device's secure communication application provides the decrypted message to the user. In block 680, the communication may be encrypted with the first device's local storage device key and stored in a local storage on the first device.

Figure 7:
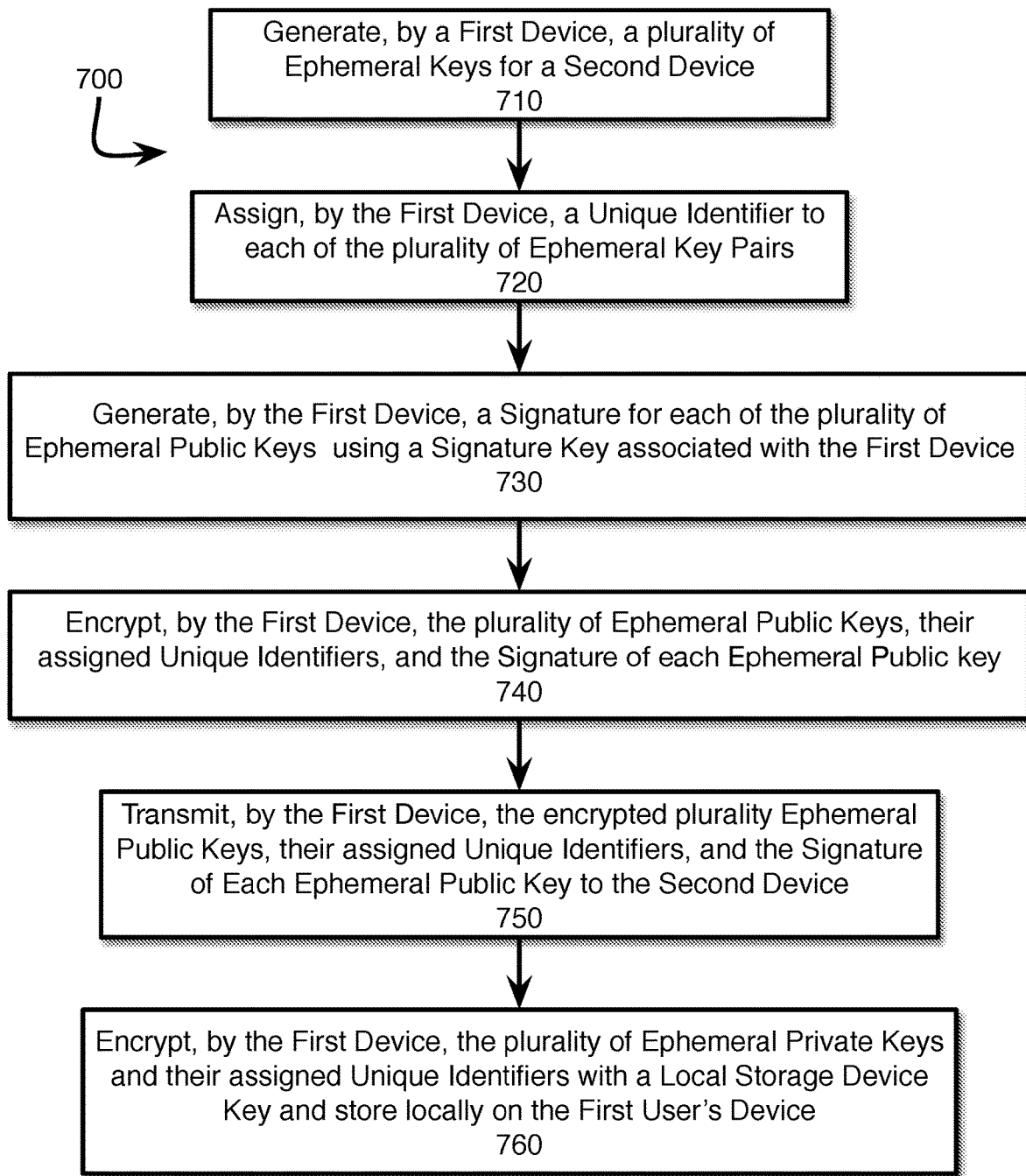
FIG. 7 show a method for transmitting a pool of ephemeral asymmetric key pairs to a user according to another example of the disclosure.

The above-described examples describe using the secure communication platform to provide a sender with a receiver's ephemeral public key. However, the first and second devices may prefer to exchange communications via a peer-to-peer exchange without having to obtain a key from the secure communication platform. Alternatively, circumstances may render the secure communication platform unavailable. For instance, the secure communication platform 120 may be unavailable or the device may be in a location where they cannot access the secure communication platform 120. In order to facilitate the encryption techniques described herein, a first device may provide a second device with a plurality of ephemeral public keys such that the second device would be able to exchange encrypted communications directly with the first device without having to request an ephemeral key from the secure communication platform. FIG. 7 illustrates a process 700 for providing a second device with a plurality of ephemeral public keys. The process 700 begins, in block 710, with the first device's secure communication application generating a second plurality of ephemeral, asymmetric key pairs. In preferred embodiments, the ephemeral asymmetric key pairs are generated according to ECC according to a fourth P-521 curve. In block 720, a unique identifier is assigned to each key pair. Next, in block 730, the secure communication application calculates a signature for each of the ephemeral public keys using the second private key associated with the device's secure communication application. In block 740, each of the ephemeral public keys, along with its unique identifier and corresponding signature, are encrypted using a random communication encryption key. In block 750, the encrypted second plurality of ephemeral public keys, their assigned unique identifiers, and the signature of each public key of the second plurality of ephemeral public keys are transmitted to the second device. That is, the encrypted second plurality of ephemeral public keys, their assigned unique identifiers, and the signature of each public key of the second plurality of ephemeral public keys are encrypted and transmitted to the second device using the techniques discussed above with respect to FIGS. 5A and 5B. In block 760, the second plurality of ephemeral private keys and their assigned unique identifiers are encrypted with the first device's local storage device key and stored locally on the first device. Process 700 may be repeated by each of the sender's secure communication applications such that the receiver has a second plurality of ephemeral public keys for each of the sender's instantiations of the secure communication application.

FIG. 8 illustrates an exemplary process 800 for receiving a second plurality of ephemeral public keys from a first device. In block 810, the first device's secure collaboration application receives an encrypted communication from the second device. In block 820, the encrypted communication is decrypted to retrieve the second plurality of ephemeral public keys, their assigned unique identifiers, and the signature of each public key of the second plurality of ephemeral public keys. Preferably, the secure collaboration application employs the processes described above with respect to FIG. 6 to decrypt the received encrypted communication. In block 830, the signature chain for each of the public keys in the second plurality of ephemeral public keys is validated. As discussed above, the second public key is used to validate the signature of each of the public keys in the second plurality of public keys, and the first public key is used to validate the signature of the second public key. If the signature chain is invalid, process 800 proceeds to block 840 where the second plurality of ephemeral public keys, their associated identifiers and corresponding signatures, is discarded. In block 850, the second device's secure communication application may be notified that the second plurality of ephemeral public keys were invalid. In some examples, block 850 may be omitted as a security measure in the event that the second plurality of ephemeral public keys were sent by a malicious user.

When the signature chain for each of the public keys in the second plurality of public keys, the process proceeds to block 860. In block 860, the second plurality of public keys and their assigned unique identifiers with the first device's local storage key. The encrypted second plurality of public keys and their assigned unique identifiers are then stored locally on the first device. The techniques described above may be performed by used by the first device to provide the second device with a second plurality of public keys.

Figure 9A:
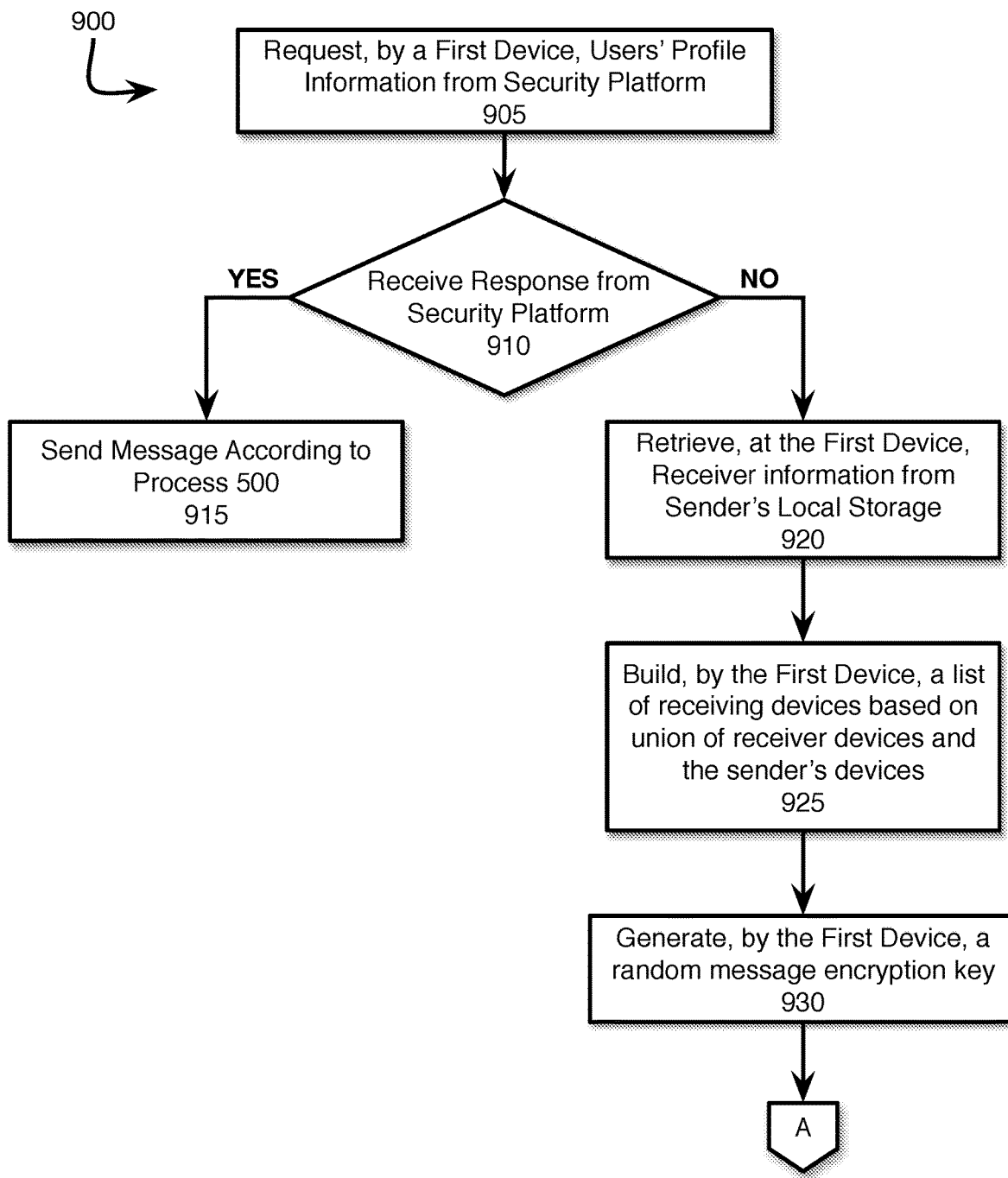
FIGS. 9A and 9B show a method for transmitting a secure message using the table of ephemeral public keys according to one example.
Figure 9B:
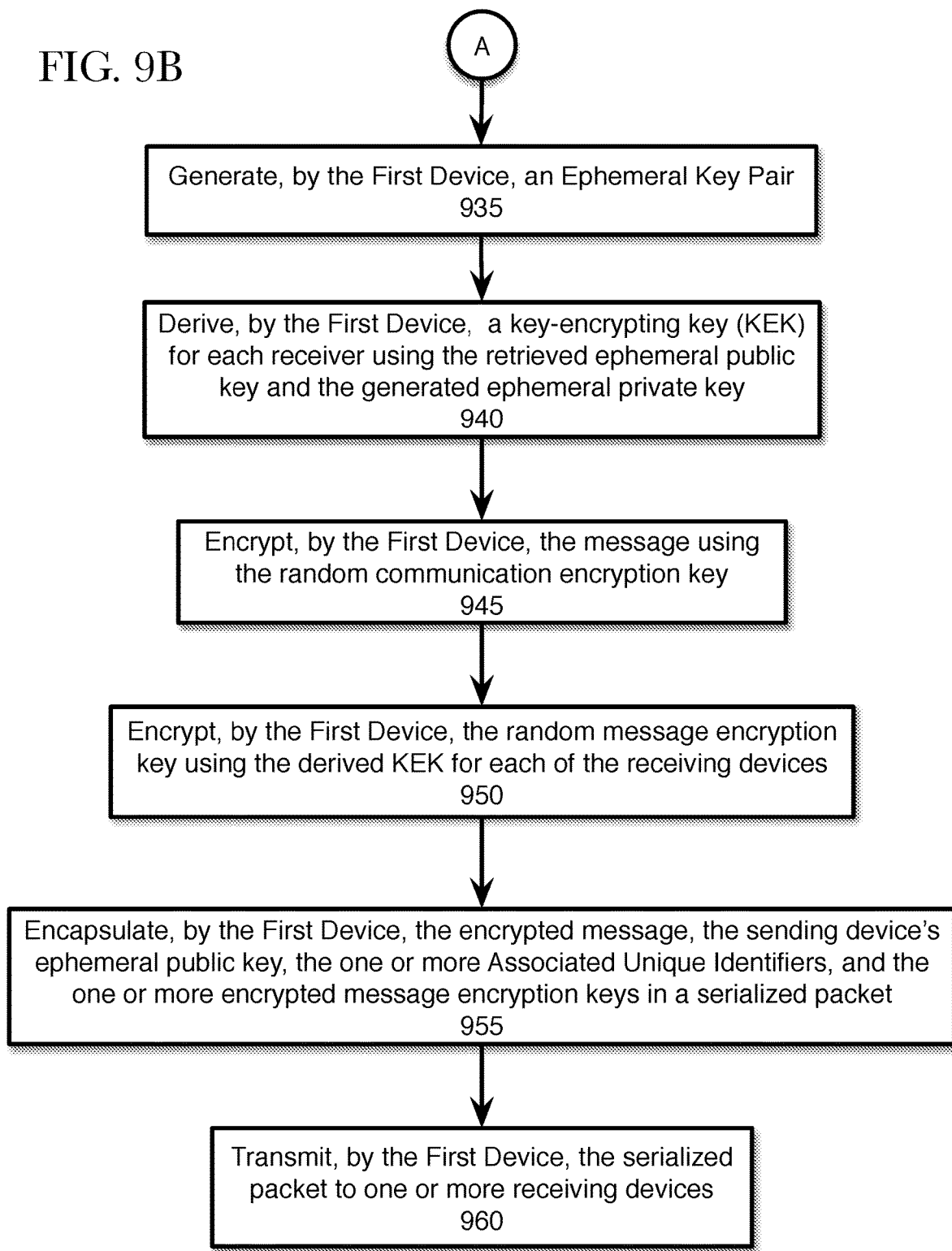

Once both devices have provided each other with a second plurality of ephemeral public keys, the devices may exchange encrypted communications using the techniques described above with respect to FIGS. 5A and 5B without having to contact the secure communication platform 120 to obtain one or more receivers user profiles and one or more ephemeral public key for each of the receivers. However, there may be occasions when devices try to obtain the ephemeral public key from the secure communication platform 120, but the secure communication platform 120 may not be available. FIGS. 9A and 9B illustrate an exemplary process 900 for sending an encrypted communication using an ephemeral public key stored locally on the first device when the secure communication platform 120 is unreachable. In block 905, a first device's secure communication application transmits a request for one or more receiver profiles to the secure communication platform. In block 910, the first device's secure communication application determines whether a response to the request has been received from the secure communication platform. If the first device's secure communication platform receives a response from the secure communication platform, process 900 proceeds to block 915, which sends an encrypted communication in accordance with process 500 described above. However, if the first device's secure communication platform fails to receive a response, process 900 proceeds to block 920, where the first device's secure collaboration application retrieves receiver information from the first device's local storage. In this regard, the first device's secure collaboration application may not receive a response from the secure communication within a predetermined period and time out. That is, the secure communication platform may exceed a response time expected by the first device's secure communication application. Accordingly, if no response is received from the secure communication platform within a predetermined period, the first device's secure communication application may determine that the secure communication platform is unreachable. Alternatively, the secure communication platform may indicate that there are no ephemeral public keys stored at the server for the receiver. In yet another alternative, the first plurality of the ephemeral keys may be depleted and the secure communication platform may provide an indication that the only key remaining on the secure communication platform is a reserve key (e.g. a key that is provided to senders repeatedly until the receiver has an opportunity to replenish the first plurality of ephemeral public keys maintained by the secure communication platform).

When retrieving receiver information from local storage, the first device's secure communication application may have to decrypt the information with the local storage device key. The first device's secure communication application will only have receiver information stored locally if the first device and second device have communicated previously.

Furthermore, the receiver information may include at least the receiver's username, the first public key, at least one second public key, at least one first ephemeral public key, and at least one key identifier. In some instances, the first device's local storage may not contain any information for the receiver. In these examples, the first device's secure communication application may display an error message.

After obtaining the receiver information from local storage, the first device's secure communication application builds a list of receiving devices based on a union of the receiver devices and sender's devices in block 925. In block 930, the first device's secure communication application generates a random communication encryption key. In block 935, the first device's secure communication application generates an ephemeral key pair. In block 940, the first device's secure communication application calculates a key-encrypting key (KEK) for each receiver device. The key-encrypting key is calculated by deriving a shared secret using the ephemeral private key the sending secure communication application generated and the receiving device's ephemeral public key retrieved from local storage on the sender's device. The shared secret may be generated according to a key agreement protocol, such as Diffie-Hellman. The generated shared secret and the receiving device's application identifier are inputted into a key derivation function to derive the key-encrypting key. Block 940 may be repeated for each of the one or more receivers' devices.

After calculating the key-encrypting key for each of the one or more receivers' devices, the first device's secure communication application encrypts the communication using the random communication encryption key in block 945. In block 950, the random communication encryption key is encrypted using the derived KEK for each receiving device. After the random communication encryption key has been encrypted with the KEK derived for each receiving device, the first device's secure communication application creates a serialized packet that includes the encrypted communication, the ephemeral public key that the first device's secure communication application generated in block 935, the one or more unique identifiers for the receiver's public key received from secure communication platform, and the one or more encrypted communication encryption keys in block 955. The first device's secure communication application transmits the serialized packet to the one or more receiver devices in block 960. In some examples, the first device's secure communication application may transmit a single serialized packet to the secure communication platform for distribution to the one or more receiving devices. Alternatively, the first device's secure communication application may directly transmit the serialized packet to each of the one or more receiving devices, for example, through a P2P communication.

The above-described examples provide a technical solution that provides users with the ability to exchange encrypted communications without having to obtain a key from the secure communication platform. In particular, providing a user with a plurality of ephemeral public keys allows the user to send encrypted communications when the user is unable to obtain a public key from the secure communication platform.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A method comprising:
    receiving, at a first device, an encrypted communication from a second device;
    decrypting, at the first device, the encrypted communication received from the second device to obtain a plurality of ephemeral public keys, their unique identifiers, and a signature for each public key of the plurality of ephemeral public keys;
    validating, by the first device, the signature of each public key in the plurality of the plurality ephemeral public keys;
    storing, in a storage medium of the first device, the plurality of ephemeral public keys when the signature of each public key in the plurality of ephemeral public keys is valid;
    transmitting, from the first device, a request for a user profile of the second device to a first server;
    determining, at the first device, whether a response to the request has been received from the first server;
    retrieving a first ephemeral public key and a key identifier from the storage medium when no response has been received from the first server;
    generating, by the first device, a first encryption key;
    deriving, by the first device, a key-encrypting key using at least the first ephemeral public key;
    encrypting, by the first device, a first communication to the second device using the first encryption key;
    encrypting, by the first device, the first encryption key using the key-encrypting key; and
    transmitting, by the first device, the first encrypted communication, the key identifier, and the encrypted first encryption key to the second device.

2. The method of claim 1, comprising:
    encrypting the plurality of ephemeral public keys with a local storage device key; and
    storing the encrypted plurality of ephemeral public keys on the first device.

3. The method of claim 2, further comprising:
    decrypting, by the first device, the first ephemeral public key prior to deriving the key-encrypting key.

4. The method of claim 1, wherein the first encrypted communication, the key identifier, and the encrypted first encryption key to the second device are transmitted to the second device using a peer-to-peer communication protocol.

5. The method of claim 1, wherein the first encryption key is derived from a first set of pseudorandom bytes.

6. The method of claim 1, wherein deriving the key-encrypting key comprises using the first ephemeral public key and a second ephemeral private key.

7. A system comprising:
    an interface configured to receive device an encrypted communication from a second device and transmit a request for a user profile of the second device to a first server;
    a processor configured to decrypt the encrypted communication received from the second device to obtain a plurality of ephemeral public keys, their unique identifiers, and a signature for each public key of the plurality of ephemeral public keys; validate the signature of each public key in the plurality of the plurality ephemeral public keys; determine whether a response to the request has been received from the first server; retrieve a first ephemeral public key and a key identifier from a memory when no response has been received from the first server; generate a first encryption key; derive a key-encrypting key using at least the first ephemeral public key; encrypt a first communication to the second device using the first encryption key; and encrypt the first encryption key using the key-encrypting key; and the memory configured to store the plurality of ephemeral public keys when the signature of each public key in the plurality of ephemeral public keys is valid.

8. The system of claim 7, wherein the processor is further configured to encrypt the plurality of ephemeral public keys with a local storage device key.

9. The system of claim 8, wherein the memory is configured to store the encrypted plurality of ephemeral public keys on the first device.

10. The system of claim 7, wherein the interface is configured to transmit the first encrypted communication, the key identifier, and the encrypted first encryption key to the second device.

11. The system of claim 9, wherein the processor is further configured to decrypt the first ephemeral public key prior to deriving the key-encrypting key.

12. The system of claim 7, wherein the first encrypted communication, the key identifier, and the encrypted first encryption key to the second device are transmitted to the second device using a peer-to-peer communication protocol.

13. The system of claim 7, wherein the first encryption key is derived from a first set of pseudorandom bytes.

14. The system of claim 7, wherein deriving the key-encrypting key comprises using the first ephemeral public key and a second ephemeral private key.

15. A non-transitory computer-readable medium comprising instructions that when, executed by at least one processor, perform the steps of:

receiving an encrypted communication from a second device;

decrypting the encrypted communication received from the second device to obtain a plurality of ephemeral public keys, their unique identifiers, and a signature for each public key of the plurality of ephemeral public keys;

validating the signature of each public key in the plurality of the plurality ephemeral public keys;

storing, in a storage medium, the plurality of ephemeral public keys when the signature of each public key in the plurality of ephemeral public keys is valid;

transmitting a request for a user profile of the second device to a first server;

determining whether a response to the request has been received from the first server;

retrieving, from the storage medium, a first ephemeral public key and a key when no response has been received from the first server;

generating a first encryption key;

deriving a key-encrypting key using at least the first ephemeral public key;

encrypting a first communication to the second device using the first encryption key;

encrypting the first encryption key using the key-encrypting key; and transmitting the first encrypted communication, the key identifier, and the encrypted first encryption key to the second device.

16. The non-transitory computer-readable medium of claim 15, comprising instructions for:

encrypting the plurality of ephemeral public keys with a local storage device key; and storing the encrypted plurality of ephemeral public keys on the first device.

17. The non-transitory computer-readable medium of claim 16, comprising instructions for:

decrypting the first ephemeral public key prior to deriving the key-encrypting key.

18. The non-transitory computer-readable medium of claim 15, wherein the first encrypted communication, the key identifier, and the encrypted first encryption key to the second device are transmitted to the second device using a peer-to-peer communication protocol.

19. The non-transitory computer-readable medium of claim 15, wherein the first encryption key is derived from a first set of pseudorandom bytes.

20. The non-transitory computer-readable medium of claim 15, wherein deriving the key-encrypting key comprises using the first ephemeral public key and a second ephemeral private key.

* * * * *